UNITED STATES PATENT OFFICE.

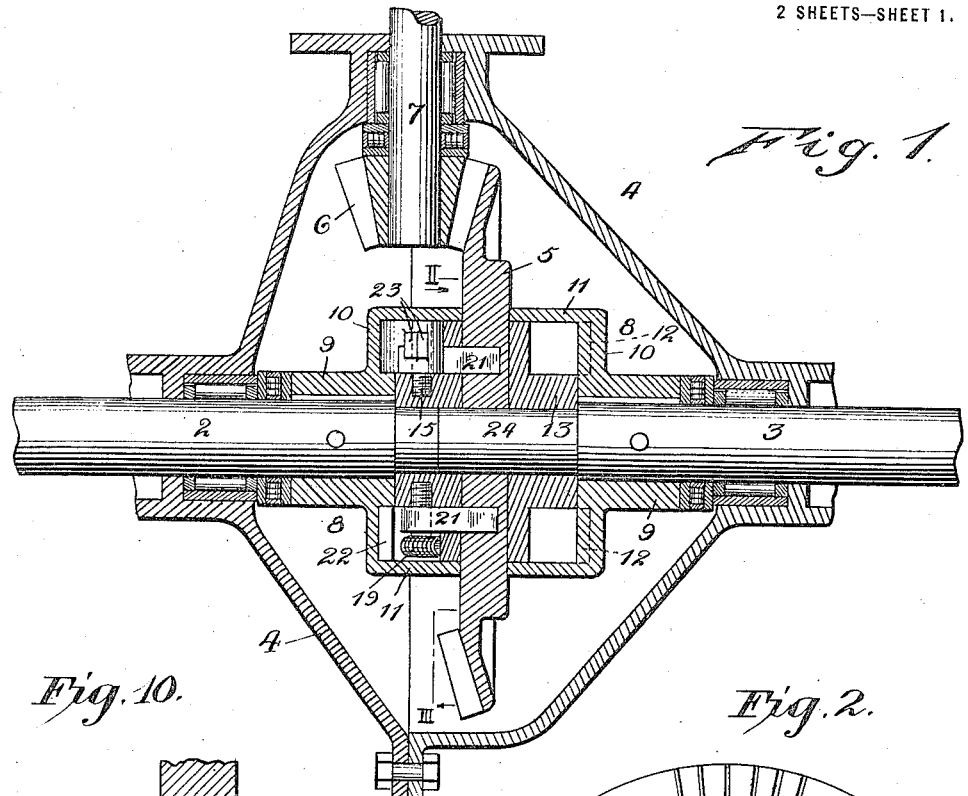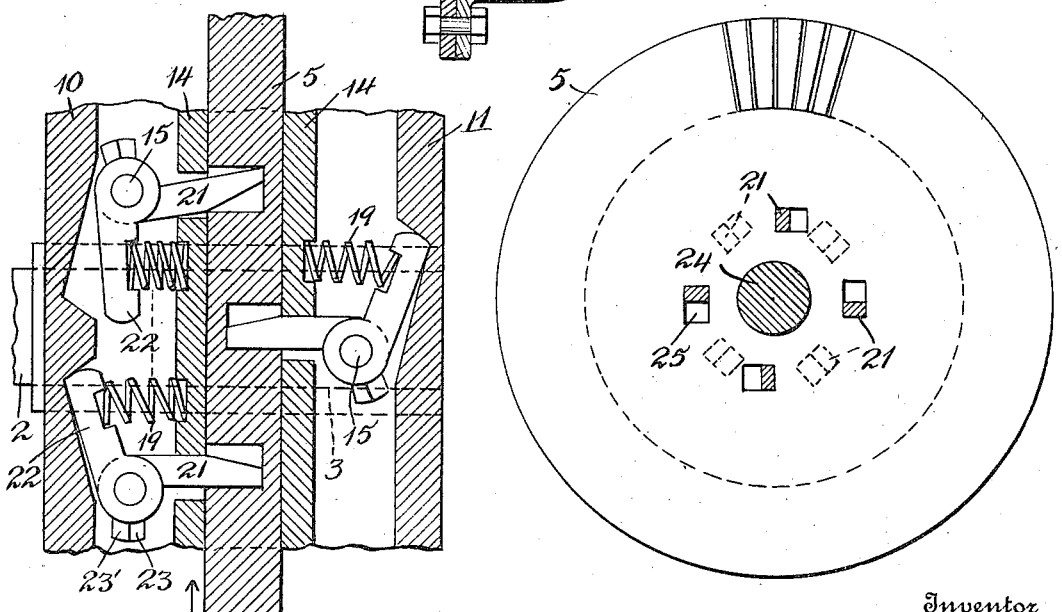

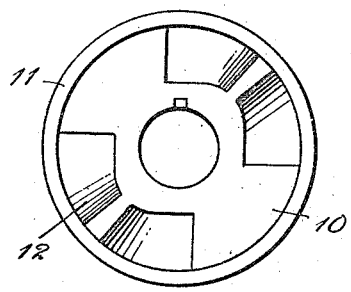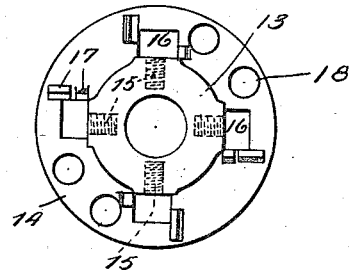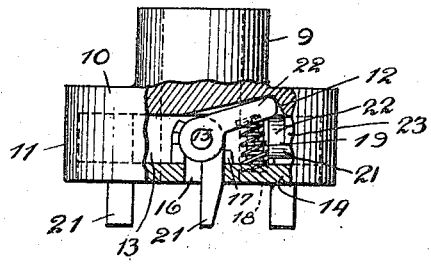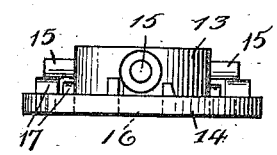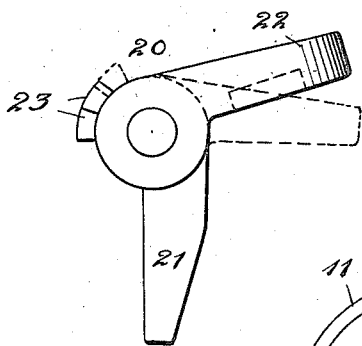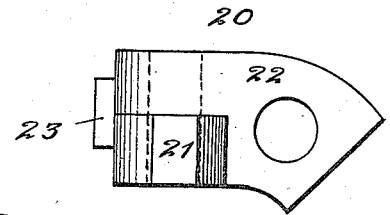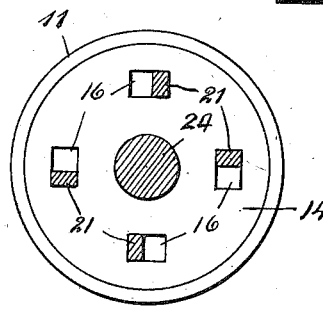

CHRISTOPHER W. LEVALLEY, OF MILWAUKEE, WISCONSIN.

TRANSMISSION-GEARING.

1,151,485.	Specification of Letters Patent.	Patented Aug. 24, 1915.

Application filed March 6, 1912. Serial No. 682,011.

*To all whom it may concern:*

Be it known that I, CHRISTOPHER W. LE-VALLEY, a citizen of the United States, residing at Milwaukee, in the county of Milwaukee and State of Wisconsin, have invented certain new and useful Improvements in Transmission-Gearing, of which the following is a specification.

My invention relates to transmission gearing and has for its object to improve mechanism of this kind in the manner hereinafter pointed out and for the purpose of producing a gearing positive in operation and simple in construction.

I have illustrated my invention in a mechanism adapted to be used for driving the traction wheels of a motor vehicle in which either wheel may have its driving connection with the motor broken or interrupted whenever it turns at a speed greater than that which, at the moment, the motor driven parts tend to impart thereto.

In the drawings, Figure 1 is a horizontal sectional view of a transmission gearing embodying my improvements. Fig. 2 is a transverse sectional view taken on the line II—III of Fig. 1 as viewed from the left and indicated by the upper arrow. Fig. 3 is a transverse sectional view taken on the line II—III of Fig. 1 as viewed from the right, and as indicated by the lower arrow, parts being broken away. Fig. 4 is a plan view of the connecting or clutch mechanism, parts thereof being broken away. Fig. 5 is a face view of one of the shaft-connecting clutch members. Fig. 6 is an inner end view of one of the supports for the driving members of the clutch. Fig. 7 is an edge or plan view of the same support. Fig. 8 is a plan view of one set of the driving members detached. Fig. 9 is an edge view or elevation of the driving members shown in Fig. 8. Fig. 10 is a sectional view, diagrammatic in character, illustrating the operation of the apparatus.

In the drawings, 2, 3, indicate respectively the two sections of a divided driven shaft, which in the mechanism illustrated is the rear axle of a motor vehicle. The inner ends of these shaft sections are represented as being suitably supported in a casing 4 where they are held in alinement with each other, their inner ends abutting. The contiguous ends of the shaft sections are preferably reduced in diameter, as indicated at 24, and upon these parts are loosely supported certain elements of the mechanism to be described. To each shaft section there is secured a clutch member 8 of the driving mechanism comprising a hub 9 keyed to the shaft, a web 10 disposed in a plane perpendicular to the axis of rotation of the shaft, and a flange 11 concentric with the shaft, which latter, however, may be omitted without departing from the principle of the invention, though it is a desirable feature of construction. The flanges of the shaft-connected clutch members face each other and are situated a distance apart to receive the drive wheel 5 which is loosely supported upon the reduced portion of the driven shaft. This drive wheel serves as a closing or face plate for the open ends of the chambers formed by the overhanging flanges 11 of the shaft-connected clutch members, thus assisting in preventing the entrance of dirt or foreign substances into the working parts of the gearing. The drive gear 5 is represented as being a bevel wheel meshing with a bevel pinion 6 upon the motor-connected drive shaft 7, these last described parts being typical of a drive mechanism of any suitable character.

Loosely supported upon the reduced portions 24 of the driven shafting are hubs 13, one on either side of the drive gear 5 and between it and the unreduced parts of the shafting. Upon these hubs are supported the means, designated as a whole by 20, that serve as the connecting elements between the drive gear 5 and the shaft-connected clutch members 8. Each hub is preferably provided with a flange or face plate 14 integral with the hub, and of a size to closely fit within the flange 11 of the shaft-connected clutch member at the outer edge thereof, as indicated in Figs. 1 and 4.

I will first describe a single set of connecting elements between the drive gear and the shaft connected clutch member 8, as these elements are substantially duplicates of each other, although they may be differently arranged for forward or backward driving.

15 represents a stud or pivot pin projecting radially from the hub 13. This is conveniently formed by screwing a cylindrical stud into a screw-threaded aperture formed in the hub, as represented in the drawings. Upon this stud is mounted one set of the connecting and driving means between the drive gear 5 and the driven clutch member 8. Each set of such means preferably consists of two parts or elements, and these, as will be seen, are free to move in planes parallel with the axis of revolution of the driven shaft. The driving and connecting means consist essentially of two parts disposed at a wide angle to each other, a tail piece 21 that extends outward through an aperture 16 in the flange 14 so as to engage with the drive gear 5, and a dog or head piece 22 arranged to engage with the web 10 of the clutch member 8. In this web is formed a recess 12 to receive the working end of the part 22, while in the face of the gear 5 is formed a recess 25 to receive the end of the tail piece 21. The two parts of the connecting and driving means are preferably both mounted upon the supporting pin or stud 15 so as to be free to independently move to a limited extent. The hub portion of the tail piece 21 is provided with a projection 23, and the hub part of the dog 22 with a similar projection 23', these two projections being normally in engagement and constituting interconnecting members between the two parts which insure that they shall move together and work as one piece when they are thrown out of operation and into inactive relation. Back of the dog or head part 22 is a spring 19 which tends to hold its working end in engagement with the web 10 of the clutch member 8. One end of the spring is seated in a recess or socket 18 formed in the plate 14, the other end bearing against the part 22.

It will be seen from the foregoing description and an examination of the drawings, that whenever the drive gear turns in a direction indicated by the arrows in Figs. 2 and 4, it will positively engage with the tail piece 21 and will carry the latter along with it, because it is prevented from rotating upon its supporting stud by the abutments 17 upon the plate 14 with which the part 21 is moved into engagement. This forward movement of the tail piece is transmitted to the support upon which it is mounted, that is to say, the hub 13 and the plate 14 thereof, and through the dog or head portion 22 and the shaft-connected clutch member 8 to the shaft 2 or 3, the dog, pawl, or driving head 22 being held by the spring 19, in working engagement within the recess 12 in the web of the clutch. Should the driven shaft be caused, for any reason, to turn at a speed faster than that being imparted to it by the driving gear the connection between these driving and driven parts will be broken or interrupted. It will be observed that one wall or face of the recess 12 is sloping, and whenever the driven shaft speeds up, as just suggested, this sloping wall of the recess 12 advances and by engagement with the dog 22 forces it out of the socket or recess, compressing the spring 19 in so doing.

While a single set of driving means will serve as a working connection between the driving gear and the driven shaft, I prefer to employ at least two sets of such devices between the gear 5 and each section of the driven shaft. I also provide means for driving in a reverse as well as a forward direction, where the use to which the invention is put demands, as in gearing for motor vehicles, and an arrangement of this character is illustrated in the drawings.

In Fig. 10 I illustrate the operation of the apparatus. In such view the drive gear 5 is supposed to be turning in the direction indicated by the arrow. Three sets of driving means are shown, one for driving the shaft section 2 in a forward direction, another for driving it in a reverse direction, and a third for driving the shaft section 3 in a forward direction. It is to be understood that means for driving the shaft section 3 in a reverse direction will be employed, and that each of the sets of devices may be duplicated, but because of limited space for illustration only the three first referred to are shown, they being sufficient to illustrate the manner in which the driving connections work. The gear 5 in its forward motion operates to engage the tail portions 21 of the two forwardly driving sets of means shown, carrying them and the face plates 14 and hubs 13 by which they are supported forward with it, until the dogs or head portions 22 of the connecting and driving means enter the recesses in the webs 10 and 11 of the clutch members that are secured to the shaft sections, the said head portions 22 being forced outward by the springs 19. This motion of the drive gear also acts upon the set of reverse driving means,—the inactive one in Fig. 10,—rocking them so that the head part 22 thereof entirely disengages the web 10. These parts, it will be seen, now act as a unit, because of the engagement of the two projections 23 and 23', the tilting of the tail portion 21 being positively communicated to the head portion 22 which is thus carried out of the recess in the web or plate 10 in which it was seated, compressing the spring 19 in so moving. The parts being in the positions indicated in Fig. 10 and just described, should one of the ground wheels begin to turn faster than the other,—that connected with shaft section 2, let it be supposed,—the clutch section 8 that is connected with such wheel will move faster than the drive gear 5, the plate 14, and the driving and connecting means carried thereby. The set of forwardly driving means will then have its dog member 22 depressed or forced out of the recess in which it was acting, by the inclined face of such recess, the spring 19 being compressed. But when this takes place the tail piece 21 of the forwardly driving set of devices just referred to does not change its position, and hence the parts are in position to immediately begin driving the moment the speed of the drive gear overtakes that of the part 10. The reverse driving means do not change their position, which is then that of inaction, when the wheel overruns, as just described. The inertia of the face plate 14, its hub 13 and the connecting and driving devices, and the friction which is developed between the plate 14 and the drive gear 5, are such that there is practically no danger of the parts so shifting as to bring the reverse driving devices into operation when the wheels overrun as has just been described. Of course it will be understood that the driving conditions are the same as those which have been described when the drive gear 5 is reversed, with the exception that the reverse driving devices are then the active ones and the forwardly driving devices the inactive.

It will be seen that the driving head 22 of the set of connecting and driving means interposed between the drive gear 5 and the shaft-connected clutch member 8 is a spring actuated driving pawl; and that the tail piece 21 is a lifting device for causing the positive disengagement of the driving pawl when the drive gear is moved in a reverse direction,—the word reverse here having reference to the particular driving pawl under consideration at any moment and not to the mechanism as a whole.

What I claim is:

1. In a transmission gearing, the combination of a driven member, a drive gear loosely supported relative to the driven member, a clutch member secured to the driven member, a hub loosely mounted relative both to the drive gear and the driven member so as to be free to turn about the axis of revolution of the driven member, the hub carrying a radially disposed stud, a face plate carried by the hub, connecting and driving means mounted upon the said stud and comprising a tail piece extending through the said face plate and arranged to be engaged by the drive gear, and a head piece arranged to engage with the said driven clutch member, and a spring acting upon the said head piece and tending to hold it in engagement with the said clutch member, the said connecting and driving parts being so arranged that when the drive gear turns in one direction they operatively connect the drive gear and driven clutch member, and when it turns in the other direction they are moved out of driving relationship.

2. In a transmission gearing, the combination of a driven member, a drive gear loosely supported relative thereto, a clutch member secured to the driven member so as to turn therewith, a support loosely mounted relative to both the drive gear and the driven member, a spring actuated driving pawl arranged to engage with the said driven clutch member, and means engaged by the drive gear arranged to carry the said driving pawl forward when the gear turns in one direction, the said means and the driving pawl being mounted upon a common pivotal support and being arranged so as to turn together, when the drive gear is moved in a reverse direction, in order to move the driving pawl into inoperative position.

3. In a transmission gearing, the combination of a driven member, a drive gear loosely supported relative thereto, a clutch member secured to the driven member so as to turn therewith, a support loosely mounted relative to both the drive gear and the driven member, and connecting and driving means between the drive gear and the said driven clutch member having one part engaged by the drive gear and another part, in the form of a spring actuated driving pawl, adapted to engage with the said clutch member, the said two parts of the driving and connecting means being carried by the aforesaid support on a common pivot about which they are arranged to turn as one when the drive gear is reversed.

4. In a transmission gearing, the combination of a driven shaft carrying a clutch member, a drive gear concentric with and loosely supported relative to the said shaft, a hub loosely supported upon the shaft between the drive gear and the clutch member, provided with a stud radially disposed relatively to the shaft, and a two-part driving connection between the drive gear and the said driven clutch member, pivotally supported upon the said stud, one part being arranged to be engaged by the drive gear and the other part being arranged to engage with the said clutch member, the said parts of the driving connection acting together when the drive gear turns in one direction to communicate motion from said gear to the driven shaft and when the drive gear turns in the other direction to move out of working connection, and one of the parts being in the form of a spring actuated pawl to permit the driven shaft to freely turn at a speed greater than that of the drive gear but not at a slower speed.

5. In a transmission gearing, the combination of a driven shaft, a clutch member secured thereto having a web and an overhanging flange, a drive gear loosely supported upon the said shaft close to the edge of the flange of the clutch, a hub loosely mounted upon the shaft within the flange of the clutch and provided with a radially disposed stud, a two-part driving connection between the drive gear and the said driven clutch member, pivoted upon the said stud, one part being in working engagement with the drive gear and the other part adapted to engage with the said clutch, the parts of the driving connection interconnecting so that they act as one piece to transmit motion from the drive gear when it moves in one direction and one part being in the form of a spring-controlled spring actuated pawl permitting the driven shaft to freely run at a speed greater than that of the drive gear but not at a less speed, and the driving connection being arranged to connect the driving and the driven parts when the former turns in one direction but not when it turns in the opposite direction.

6. In a transmission gearing, the combination of a driven shaft, a clutch carried thereby having a web and an inturned flange, a drive gear loosely supported on the shaft adjacent to the clutch, a hub loosely mounted on the shaft within the flange of the clutch and provided with a radially disposed stud and a flange closing the space inclosed by the flange of the clutch, a tail piece pivoted on the said stud and extending outward and engaging with the said drive gear, and a pawl also pivoted on the said stud and arranged to engage with the said shaft-connected clutch member, and a spring for holding the pawl in working engagement with the clutch member, allowing it to be disconnected therefrom when the driven shaft turns faster than the drive gear, the said tail piece and pawl being interconnected so that they move as one under the action of the drive gear when it is turned in one direction.

7. In a transmission gearing, the combination of a two-part driven shaft each part carrying a clutch member, a drive gear mounted between the said clutch members and supported so as to turn freely relatively thereto, supports loosely mounted relatively to both the drive gear and the driven shaft sections, and sets of connecting and driving means carried by the said supports on fulcrums radial to the axis of the driven shaft, each set of connecting and driving means having one part engaged by the drive gear and another part adapted to engage with the clutch member when the drive gear turns in one direction and to free itself from driving connection when it turns in the opposite direction, the parts that engage with the driving clutch members being in the form of spring actuated driving pawls.

CHRISTOPHER W. LEVALLEY.

Witnesses:
   JOHN S. BARKER,
   GEO. B. PITTS.